(12) United States Patent
Smith et al.

(10) Patent No.: US 11,875,782 B2
(45) Date of Patent: Jan. 16, 2024

(54) EVENT SENSING SYSTEM

(71) Applicant: American Family Mutual Insurance Company, S.I., Madison, WI (US)

(72) Inventors: Michael Smith, Madison, WI (US); Ben Zimmerman, Madison, WI (US); Sherry Eckholm, Madison, WI (US); Peter Gunder, Madison, WI (US)

(73) Assignee: American Family Mutual Insurance Company, S.I., Madison, WI (US)

( * ) Notice: Subject to any disclaimer, the term of this patent is extended or adjusted under 35 U.S.C. 154(b) by 133 days.

(21) Appl. No.: 17/393,880

(22) Filed: Aug. 4, 2021

(65) Prior Publication Data

US 2021/0366465 A1 Nov. 25, 2021

Related U.S. Application Data (63) Continuation of application No. 16/293,930, filed on Mar. 6, 2019, now Pat. No. 11,100,918.
(Continued)

(51) Int. Cl.
*G10L 15/08* (2006.01)
*G06F 17/18* (2006.01)
(Continued)

(52) U.S. Cl.
CPC ............. *G10L 15/08* (2013.01); *G06F 17/18* (2013.01); *G06N 20/00* (2019.01); *G06Q 40/08* (2013.01);
(Continued)

(58) Field of Classification Search
CPC ............... G10L 15/08; G10L 21/0232; G10L 2021/02163; G10L 25/18; G10L 25/51;
(Continued)

(56) References Cited

U.S. PATENT DOCUMENTS 5,125,268 A 6/1992 Caron
5,528,224 A 6/1996 Wang
(Continued)

FOREIGN PATENT DOCUMENTS

CA 2200830 9/1998
FR 2830332 4/2003

OTHER PUBLICATIONS

Bedoya et al. "Automatic identification of rainfall in acoustic recordings". Ecological Indicators 75 (2017), pp. 95-100 (Year: 2017).*
(Continued)

*Primary Examiner* — Jesse S Pullias
(74) *Attorney, Agent, or Firm* — Foley & Lardner LLP (57) ABSTRACT

An event sensing system includes one or more sensor assemblies, each sensor assembly including a housing, a microphone, and an audio signal processor. The audio signal processor is configured to generate one of an event classification, which is indicative of a type of event, and an event characteristic, which is indicative of a severity of an event, from the audio signal. The sensor assembly is configured to transmit event records that contain the generated event data to a cloud infrastructure component. The cloud infrastructure component is configured to calculate the probability of an event occurring at a plurality of locations in a region within a bounded time window based on the event records received from a plurality of sensor assemblies.

20 Claims, 8 Drawing Sheets

Related U.S. Application Data (60) Provisional application No. 62/723,404, filed on Aug. 27, 2018.

(51) Int. Cl.
    *G10L 21/0232* (2013.01)
    *G06N 20/00* (2019.01)
    *G06Q 40/08* (2012.01)
    *G10L 21/0216* (2013.01)

(52) U.S. Cl.
    CPC ...... *G10L 21/0232* (2013.01); *G10L 2021/02163* (2013.01)

(58) Field of Classification Search
    CPC ........ G06F 17/18; G06N 20/00; G06N 3/045; G06Q 40/08
    See application file for complete search history.

(56) References Cited

U.S. PATENT DOCUMENTS

| | | | |
|---|---|---|---|
| 7,114,388 B1 | 10/2006 | French et al. | |
| 7,949,548 B2 | 5/2011 | Mathai et al. | |
| 8,106,769 B1 | 1/2012 | Maroney et al. | |
| 9,078,102 B2 | 7/2015 | Edge et al. | |
| 9,311,676 B2 | 4/2016 | Helitzer et al. | |
| 9,632,211 B2 | 4/2017 | Loffler-Mang et al. | |
| 9,710,858 B1 | 7/2017 | Devereaux et al. | |
| 9,727,921 B2 | 8/2017 | Cook et al. | |
| 9,772,428 B2 | 9/2017 | Asrani | |
| 9,783,159 B1 | 10/2017 | Potter et al. | |
| 9,830,932 B1 | 11/2017 | Gunderson et al. | |
| 9,841,533 B2 | 12/2017 | Wolf et al. | |
| 9,846,094 B2 | 12/2017 | Martin et al. | |
| 9,947,050 B1 | 4/2018 | Pietrus et al. | |
| 9,947,202 B1 | 4/2018 | Moon et al. | |
| 10,300,876 B1 | 5/2019 | Jacob et al. | |
| 10,581,935 B2 | 3/2020 | Bostick et al. | |
| 10,723,312 B1 | 7/2020 | Potter et al. | |
| 11,100,918 B2 * | 8/2021 | Smith | G10L 25/51 |
| 2002/0093591 A1 | 7/2002 | Gong et al. | |
| 2002/0103622 A1 | 8/2002 | Burge | |
| 2004/0127807 A1 | 7/2004 | Hatlesad et al. | |
| 2009/0087003 A1 | 4/2009 | Zurek et al. | |
| 2009/0265193 A1 | 10/2009 | Collins et al. | |
| 2010/0142715 A1 | 6/2010 | Goldstein et al. | |
| 2011/0137656 A1 | 6/2011 | Xiang et al. | |
| 2012/0078397 A1 | 3/2012 | Lee et al. | |
| 2012/0220276 A1 | 8/2012 | Kobylarz | |
| 2013/0000667 A1 | 1/2013 | Sobol | |
| 2013/0065569 A1 | 3/2013 | Leipzig et al. | |
| 2013/0222133 A1 | 8/2013 | Schultz et al. | |
| 2014/0136242 A1 | 5/2014 | Weekes et al. | |
| 2014/0167969 A1 | 6/2014 | Wedig et al. | |
| 2014/0222436 A1 | 8/2014 | Binder et al. | |
| 2014/0245165 A1 | 8/2014 | Battcher et al. | |
| 2014/0249847 A1 | 9/2014 | Soon-Shiong et al. | |
| 2014/0278395 A1 | 9/2014 | Zurek et al. | |
| 2014/0278573 A1 | 9/2014 | Cook | |
| 2014/0358592 A1 | 12/2014 | Wedig et al. | |
| 2015/0025917 A1 | 1/2015 | Stempora | |
| 2015/0055788 A1 | 2/2015 | Zakis | |
| 2015/0154712 A1 | 6/2015 | Cook | |
| 2015/0170288 A1 | 6/2015 | Harton et al. | |
| 2015/0221321 A1 | 8/2015 | Christian | |
| 2015/0248730 A1 | 9/2015 | Pilot et al. | |
| 2016/0029111 A1 | 1/2016 | Wacquant et al. | |
| 2016/0078883 A1 | 3/2016 | Oami et al. | |
| 2016/0150338 A1 | 5/2016 | Kim et al. | |
| 2016/0163168 A1 | 6/2016 | Brav et al. | |
| 2016/0379456 A1 | 12/2016 | Nongpiur et al. | |
| 2017/0025000 A1 | 1/2017 | Lagassey | |
| 2017/0039307 A1 | 2/2017 | Koger et al. | |
| 2017/0093657 A1 | 3/2017 | Angus | |
| 2017/0142515 A1 | 5/2017 | Makris et al. | |
| 2017/0161614 A1 * | 6/2017 | Mehta | G06N 20/00 |
| 2017/0208407 A1 | 7/2017 | Sapozhnykov | |
| 2017/0261647 A1 | 9/2017 | Wolf et al. | |
| 2018/0224859 A1 | 8/2018 | Brudner et al. | |
| 2018/0225939 A1 | 8/2018 | Subramanian et al. | |
| 2018/0233125 A1 | 8/2018 | Mitchell et al. | |
| 2018/0268798 A1 | 9/2018 | Mustiere et al. | |
| 2019/0043518 A1 | 2/2019 | Li | |
| 2019/0162811 A1 | 5/2019 | Qiao et al. | |
| 2019/0188797 A1 | 6/2019 | Przechocki et al. | |
| 2020/0020328 A1 | 1/2020 | Gordon et al. | |
| 2020/0020329 A1 | 1/2020 | Gordon et al. | |

OTHER PUBLICATIONS

Farina et al. "Testing the ecoacoustics event detection and identification (EEDI) approach on Mediterranean soundscapes". Ecological Indicators 85 (2018), pp. 698-715, available online Nov. 22, 2017 (Year: 2017).*

Eldridge, Alice. "Perspectives in Ecoacoustics". http://www.emutelab.org/blog/almoFarina, posted Mar. 8, 2018 (Year: 2018).*

Final Office Action on U.S. Appl. No. 16/293,930 dated Jan. 28, 2021.

Khunarsal et al. "Very short time environmental sound classification based on spectrogram pattern matching". Information Sciences 254 (2013), pp. 57-74 (Year: 2013).

Non-Final Office Action on U.S. Appl. No. 16/293,930 dated Sep. 9, 2020.

Notice of Allowance on U.S. Appl. No. 16/293,930 dated Apr. 23, 2021.

* cited by examiner

EVENT SENSING SYSTEM

CROSS-REFERENCE TO RELATED APPLICATIONS

This application claims priority to U.S. application Ser. No. 16/293,930, filed Mar. 6, 2019, which claims the benefit of and priority to U.S. Provisional Patent Application No. 62/723,404, filed Aug. 27, 2018, the entire disclosure of which is hereby incorporated by reference in its entirety for any and all purposes.

BACKGROUND

The present disclosure relates generally to the field of sensing and event detection systems. More specifically, the present disclosure relates to an event sensing system that collects, classifies, and extracts insights, from ambient audio.

SUMMARY

One embodiment relates to a sensor assembly including a housing, one or more microphone(s), an audio signal processor, and a communications interface. Each of the microphone(s), the audio signal processor, and the communications interface are disposed within an internal volume of the housing. The audio signal processor is configured to process a continuous audio signal generated by the microphone(s) and to generate an event classification and at least one event characteristic from the continuous audio signal, where the event classification is indicative of a type of event and the event characteristic is indicative of an attribute associated with the type of event. The audio signal processor is configured to transfer event records that include the event classification and the event characteristic(s) to the communications interface.

In some embodiments, the process of generating the event classification includes filtering out volume levels of the audio signal that are below a predetermined threshold and/or filtering out of the audio signal frequencies above or below predetermined thresholds, extracting relevant data from the audio signal, and classifying the event based on the extracted data.

Another embodiment relates to an event sensing system that includes a plurality of sensor assemblies. Event records output from each of the sensor assemblies are received by a cloud infrastructure component. The cloud infrastructure component is configured to compute a probability associated with an event occurring at a plurality of locations in a region within a bounded time window based on the event records received from the plurality of sensor assemblies. The cloud infrastructure is configured to identify whether the event occurred based on the calculated probability.

In any of the above embodiments, the event may be a weather related event such as hail, rainfall, or extreme wind.

Another embodiment relates to a method of generating and processing event data from an event sensing system. The method includes capturing raw ambient audio as an analog audio signal using a microphone located in, on or in proximity to a building, converting the analog audio signal to digital data, processing the digital data into event records, transferring the event records to a cloud infrastructure component, and identifying a type of event and attributes of the event based on the event records. The method may further include notifying an owner of the event, notifying the an owner of potential damage and/or losses related to the event, alerting the owner of a potential forthcoming event, comparing event records with an insurance claim received from the owner to help mitigate fraud or remotely assess damage value, assisting an owner with filing an insurance claim, and providing the owner with suggestions for event remediation or mitigation.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. Various embodiments are described in more detail below in connection with the appended drawings.

In the following detailed description, various embodiments are described with reference to the appended drawings. The skilled person will understand that the accompanying drawings are schematic and simplified for clarity and therefore merely show details which are essential to the understanding of the present disclosure, while other details have been left out. Like reference numerals refer to like elements or components throughout. Like elements or components will therefore not necessarily be described in detail with respect to each figure. It will further be appreciated that certain actions and/or steps may be described or depicted in a particular order of occurrence while those skilled in the art will understand that such specificity with respect to sequence is not actually required.

DETAILED DESCRIPTION

Before turning to the figures, which illustrate the embodiments of this disclosure in detail, it should be understood that the present disclosure is not limited to the details or methodology set forth in the description or illustrated in the figures. It should also be understood that the terminology used herein is for the purpose of description only and should not be regarded as limiting.

In general, disclosed herein are systems and methods for acoustic event detection. Currently, there are events of potential significance to property owners, and specifically building owners, which lack a ground truth data source capable of event detection, characterization, and reporting. The event may be a weather related event such as hail, rainfall, extreme wind, etc. Alternatively, the event may be associated with animal activity, devices operating in close proximity to the building, theft, malfunctioning equipment inside the building, water leaks or other activities that might result in building damage.

This disclosure provides, in relevant part, an event sensing system that includes one or more remotely located, self-contained sensor assemblies. The sensor assemblies are located proximate to places where events of interest may occur. For example, the sensor assemblies may be located inside of a building (e.g., a structural member for a building, a non-structural wall inside a room of a building, etc.), outside of a building (e.g., on a roof of a building, on grounds near a building, etc.), on equipment near a building. Each sensor assembly includes a microphone disposed within a housing. The microphone is configured to measure ambient audio in proximity to the sensor assembly. The sensor assembly further includes an audio signal processor that is configured to interpret the raw audio data collected by the microphone and determine the type of event associated with the raw audio data (e.g., a hail event, a rainfall event, etc.). The audio signal processor is further configured to determine attributes associated with the type of event, which in some embodiments is correlated to the intensity or magnitude of the audio data and the duration of the audio signal that corresponds to that event type. The type of event and the attributes of the event are transferred from the audio signal processor to a communication interface in the form of event records.

Another aspect of the present disclosure provides a cloud infrastructure component communicatively coupled to a plurality of sensor assemblies. Event records are transmitted from each sensor assembly to the cloud infrastructure component via the communications interface, which may include a wireless internet connection, a wired internet connection, or another suitable communications protocol or system. The cloud infrastructure component is configured to determine whether a given event has occurred at a plurality of locations in a region within a bounded time window based on the event records received from the plurality of sensor assemblies. The cloud infrastructure component and/or other system components may be configured to notify an owner of the events occurrence and of potential damage and/or losses related to the event.

The cloud infrastructure component may also be configured to compute and provide macro characteristics of the event. For example, the cloud interface component may be configured to calculate attributes of the event at different locations within the region, where the attributes of the event in at least some locations are determined using event records from surrounding sensors. The cloud infrastructure component may be configured to predict trends at multi-sensor level. For example, the cloud infrastructure component may be configured to determine the directionality and speed of a weather-related event (wind, hail, rain, etc.) by comparing event records from multiple sensor assemblies located at various positions within the region. These macro characteristics may be provided to an owner of the building as notification of a potential weather hazard in advance of the event. Such notification would allow the owner to make the necessary preparations in anticipation of the event (e.g., by securing loose items that could be blown into the building, by closing doors and windows, by covering or storing vehicles, etc.). The details of the general depiction provided above will be more fully explained with reference to FIGS. 1-6.

Figure 1:
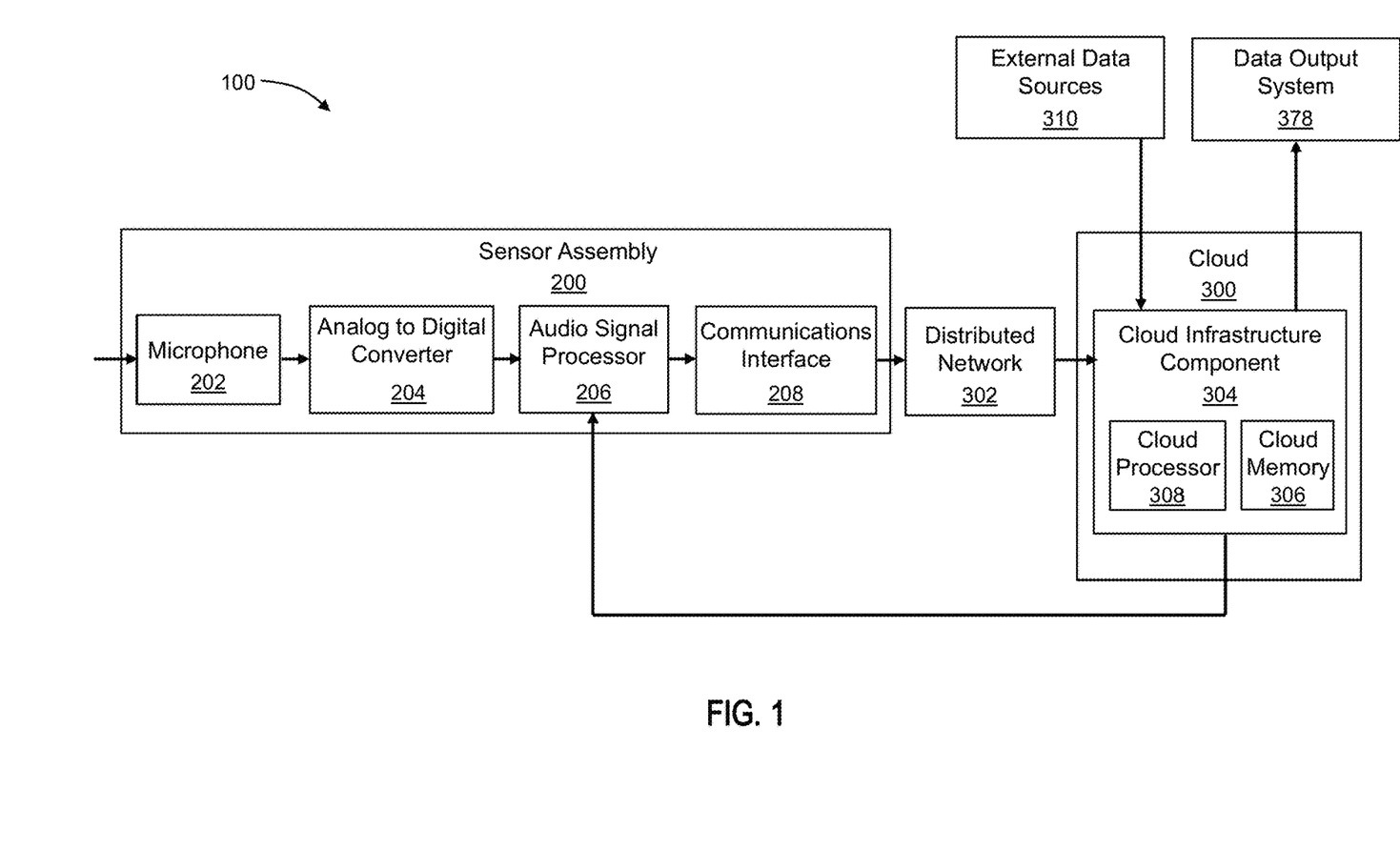
FIG. 1 is a schematic illustration of an event sensing system, according to an illustrative embodiment.

FIG. 1 shows a schematic illustration of an event detection system, shown as system 100, according to an illustrative embodiment. The system 100 includes a sensor assembly, shown as sensor 200, configured to receive and process ambient audio continuously. The raw audio is captured using a microphone 202, which outputs an analog voltage corresponding to a sound level of the ambient audio in proximity to the sensor 200. The sensor 200 further includes an analog-to-digital converter 204, which transforms the analog voltage output from the microphone 202 into digital data. The digital data is processed using an audio signal processor 206, which utilizes algorithms to determine the type of event associated with the digital data. In some embodiments, the audio signal processor 206 is also configured to determine an attribute of the event (e.g., intensity of falling precipitate, density of precipitate, duration, etc.). The audio signal processor 206 outputs event records that include the event data to a communications interface 208, which transmits the event records via a distributed network (e.g., an internet of things (IoT) service) to a cloud infrastructure component 304 in the cloud 300.

As shown in FIG. 1, the system 100 further includes a cloud infrastructure component 304. The cloud infrastructure component 304 may include one device or a combination of devices configured to aggregate and process event records output by the sensor 200. In the embodiment of FIG. 1, the cloud infrastructure component 304 includes a cloud processor 308 and cloud memory 306. As will be further described, the cloud processor 308 is configured to query and analyze event records that are stored within the cloud memory 306 to identify events and characterize their severity. In the embodiment of FIG. 1, aggregated data is deposited in cloud memory 306 in a form that may be readily accessed by the cloud processor 308 using one or more application programming interface (API) services. The API services are configured to facilitate the export of event records from cloud memory 306 for incorporation into one of a variety of different data processing schemes (e.g., data visualizations, analysis, etc.). The API services are also configured to supply data from external data sources 310 into cloud memory 306 to improve the accuracy and the reliability of the system 100. External data sources include but are not limited to third party servers, portable computing devices, and other IoT devices configured to supply event-related data. Examples of event-related data that may be supplied by the external data sources 310 include third party weather data (e.g., NOAA weather and satellite data), service provider information (e.g. repair contractors and insurance providers) and event data provided by individual users of a web-based reporting interface. The external data sources 310 provide event-related data that is independent from the sensor 200. The event-related data may be incorporated into reports, visualizations, or other reporting schemes that are generated using the event records stored in cloud memory 306. For example, satellite data may be overlaid onto a map showing the probability of a weather event at various sensor locations during a given time interval to provide redundancy of data and thereby increase confidence in later determinations regarding the weather event.

The cloud infrastructure component 304 is configured to compute a probability associated with an event occurring at a plurality of locations in a region within a bounded time window (e.g., a timeframe relative to the type of event, etc.) based on the event records received from the sensor 200. Among other benefits, this functionality allows a user of the system 100 to verify the occurrence and severity of damage related to the event in locations that do not include a sensor 200 (e.g., locations different from those in which a sensor is specifically located). This functionality also provides a mechanism to determine macro characteristics of the event such as event speed, shape, severity, directionality, etc. Among other benefits, these macro characteristics may be used to help facilitate processing of insurance claims and other insurance-related processes including mitigation of insurance fraud and determination of approximate damage value in locations that are remotely located from the sensors 200. For example, the severity of the event may be evaluated proximate to an insured building. If the severity of the event is above a predetermined threshold (e.g., a threshold relative to the event type), an insurance claim may be automatically generated. In yet another example, data (e.g., insurance claims information, etc.) supplied from an owner of an insured building or an inspector of an insured building may be compared with the macro characteristics of the event (e.g., event severity and duration) to mitigate insurance fraud. The event severity could be output in the form of an intensity of the event (e.g., hailstones of a given size per second, etc.) or as a probability of the event resulting in damage to a building (e.g., a probability whose value is determined by the event intensity and past records of event-related damage associated with that intensity).

The audio signal processor 206 of the sensor 200 is used to determine or classify the event type and to calculate the severity of the event as will be further described. The audio signal processor 206 implements algorithms (e.g., a machine learning algorithm) to extract event data from the audio signal captured by the microphone 202. As shown in FIG. 1, the audio signal processor 206 is configured to undergo additional "training" (e.g., receive updates) to improve existing models and add new classifiable event types. As shown in FIG. 1, updates to the algorithms and parameters used by the audio signal processor 206 are distributed from a updated software package that is accessible from the cloud 300, and more specifically, from cloud memory 306 in the cloud infrastructure component 304. The software package may be periodically updated at regular intervals or when required based on the content of the associated updates.

Figure 2:
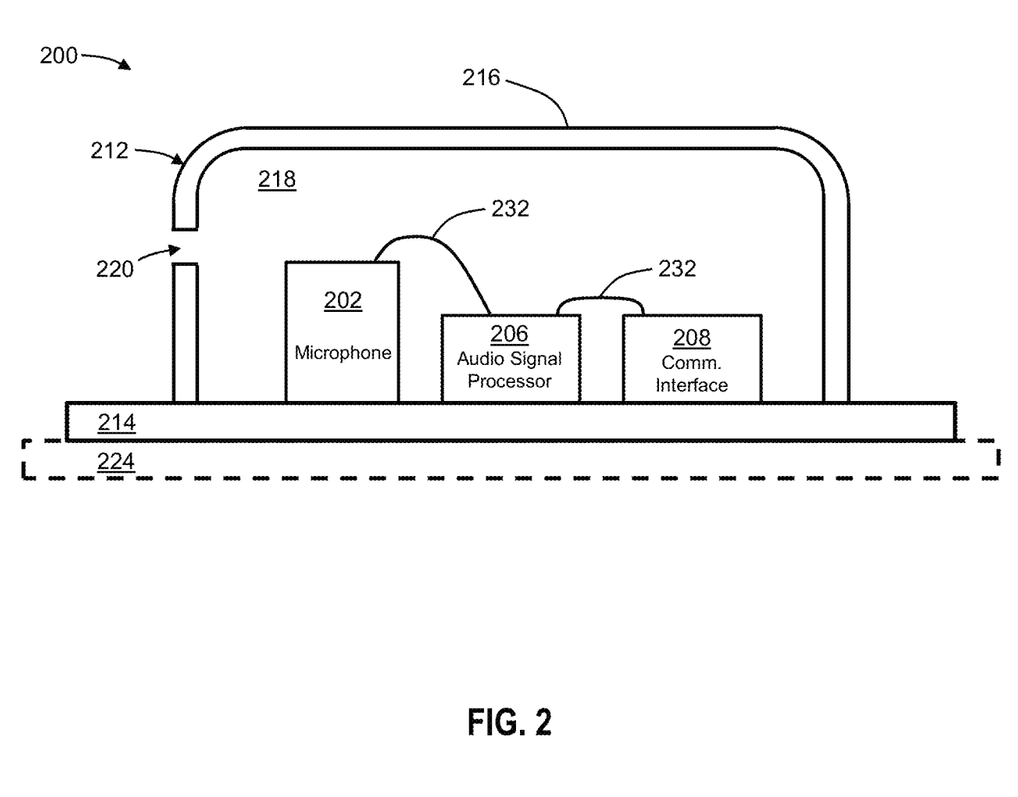
FIG. 2 is a cross-sectional view of a sensor assembly for an event sensing system, according to an illustrative embodiment.

An illustrative embodiment of the sensor 200 is shown in FIG. 2. The sensor 200 includes a housing 212 that further includes a base 214 and a cover 216. The cover 216 is removably coupled to the base 214 proximate to a peripheral edge of the base 214. Together, the base 214 and the cover 216 define an internal volume 218 within which sensitive electronic components may be stored. In an embodiment, the base 214 and cover 216 are both made from a shockproof material such as plastic including acrylonitrile butadiene styrene (ABS) and polydicyclopentadiene (PDCPD), or a combination thereof. In some embodiments, the housing 212 further includes a pad disposed on the cover 216, the pad configured to absorb impacts and thereby prevent sounds from being transmitted into the internal volume 218 through the cover 216. The housing 212 is configured to prevent water and debris from entering the internal volume 218.

The base 214 of the sensor 200 shown in FIG. 2 is coupled to a surface 224 of a building (e.g., a residential home, commercial business, etc.) in a location that allows the sensor 200 to collect data representative of the environment to which the surface is exposed. The sensor 200 may be coupled to an interior or exterior surface of the building using an adhesive product or fasteners such as bolts, screws, clips, or any combination thereof. In the embodiment of FIG. 2, the sensor 200 is rigidly coupled to the surface 224 to prevent the sensor 200 from moving relative to the surface 224, which could potentially alter the character (i.e., frequency, magnitude, etc.) of sounds received by the sensor 200. In one embodiment, the base 214 is coupled to a roof of a residential home in a location that allows the sensor 200 to collect hail, rain, wind, and other weather event related data. In another embodiment, the base 214 is coupled to a structural member of an open air storage facility in a location that allows the sensor 200 to collect data associated with wind and other structural loading events.

As shown in FIG. 2, the housing 212 additionally includes a sound port 220 disposed in a sidewall 222 of the cover 216. The sound port 220 is a small aperture configured to convey ambient sounds from the environment surrounding the housing 212 into the internal volume 218. In some embodiments, the sound port 220 includes a finely perforated screen that filters out unwanted contaminants that would otherwise migrate into the housing 212. In other embodiments, the housing 212 is completely closed off, and the only sounds received within the internal volume 218 are those transferred through the cover 216 or base 214.

A plurality of electrical components is disposed within the internal volume 218 of the housing 212. As shown in FIG. 2, the sensor 200 includes a microphone 202, an audio signal processor 206 electrically coupled to the microphone 202, and a communications interface 208 electrically coupled to the audio signal processor 206. The microphone 202, audio signal processor 206, and communications interface 208 are disposed on the base 214 of the housing 212. The electrical connections between components are made using a plurality of bonding wires 232 that extend between one or more electrical contacts for each component. In other embodiments, at least one of the microphone 202, the audio signal processor 206, and the communications interface 208 are soldered to an integrated circuit board whose electrical connections are in the form of circuit traces between the various components. The electrical components may be powered by battery, solar, or direct AC, depending on the location of the sensor 200 and its proximity to an external power source.

The microphone 202 may be one of a variety of different acoustic transducers, including a capacitive transducer, a piezoelectric transducer, a microelectromechanical system (MEMS) transducer, etc. In the embodiment of FIG. 2, the sensor 200 includes a single microphone 202. In other embodiments, more than one microphone 202 is used. Among other advantages, using more than one microphone 202 allows for more uniform collection of acoustic activity about the perimeter of the housing 212. In embodiments with multiple microphones 202, the cover 216 may include additional sound ports 220 to prevent noise or unwanted acoustic disturbances from polluting the resulting audio signal. In yet other embodiments, the sensor 200 includes a second microphone disposed outside of the housing (not shown); the second microphone configured to output a second audio signal, whereby a difference in the audio signal output by the microphone disposed in the housing and the second audio signal is used to improve the accuracy of event classification. The second microphone may be directly exposed to ambient, enclosed in a housing of different construction, immersed in a liquid, etc. Among other factors, the character of the audio signal collected by the microphones 202 is a function of the housing material and construction, the arrangement of the microphone within the housing, and the medium through which the sound must travel before reaching the microphone. The microphone 202 is configured to convert sound waves that are received through the sound port 220 into a corresponding electrical signal (e.g., a voltage proportional to the magnitude of the ambient sound received through the sound port 220). In some embodiments, the microphone 202 is configured to operate in an idle mode and activate periodically to sample audio data. Once an event is detected, the microphone 202 enters a powered mode, where audio data is sampled more regularly. In other embodiments, the microphone 202 is configured to only operate in the powered mode.

Figure 3:
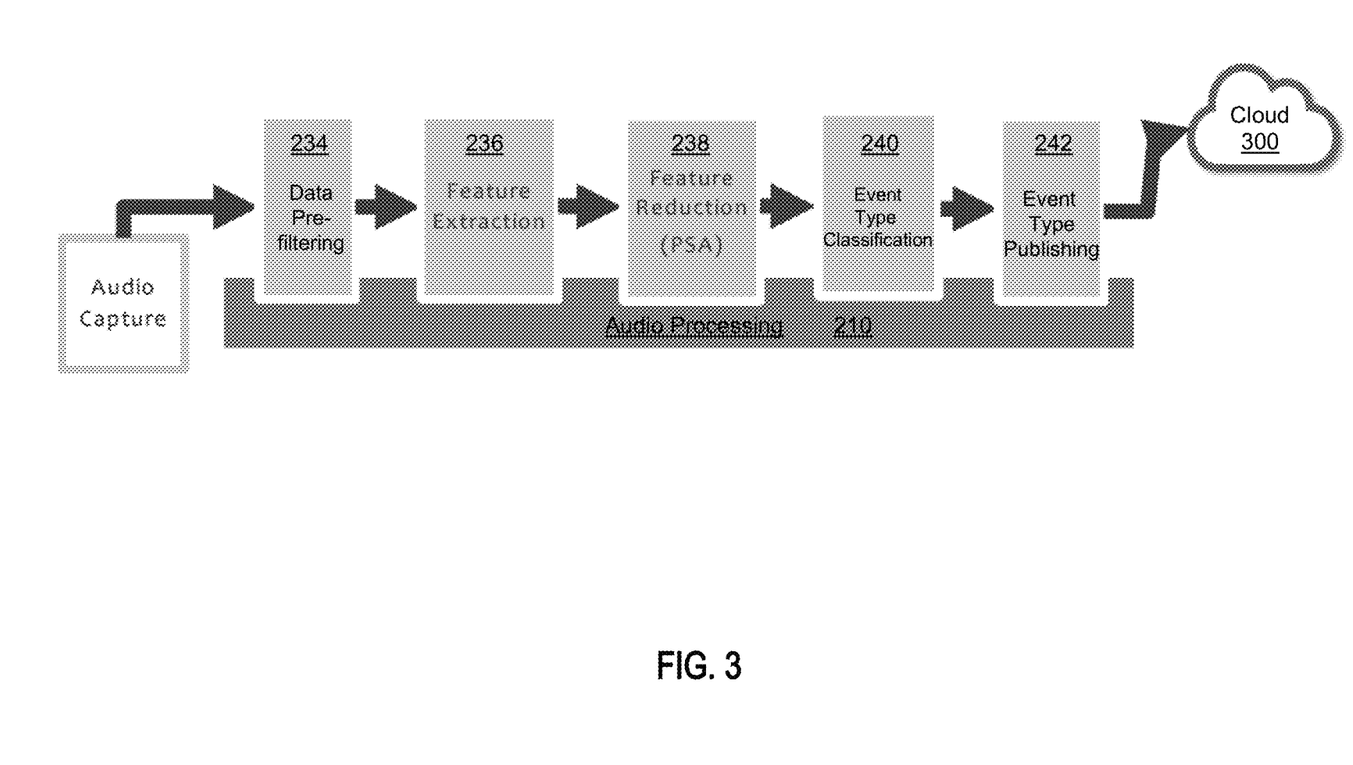
FIG. 3 is a block diagram that shows an audio processing method used in a sensor assembly of an event sensing system, according to an illustrative embodiment.

As shown in FIG. 1, the electrical signal output by the microphone 202 is processed by an analog-to-digital converter (not shown in FIG. 2), which transforms the electrical signal into digital data. The digital data is received by the audio signal processor 206 (see also FIG. 2), which is configured to generate one of an event classification and an event characteristic from the digital data. The event classification is indicative of a type of event (e.g., hail vs. rain vs. other), while the event characteristic is indicative of a severity of the type of event. As shown in FIG. 3, processing of the digital audio data by the audio signal processor 206 is accomplished by continuous application of an audio processing method, shown as method 210. The hardware and data processing components used to implement the various processes, operations, illustrative logics, logical blocks, modules and circuits described in connection with the audio signal processor 206 may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The audio signal processor 206 may include a memory component (e.g., memory, memory unit, storage device, etc.) including one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an illustrative embodiment, the memory (not shown) is communicably connected to the audio signal processor 206 via a processing circuit and includes computer code for executing (e.g., by the processing circuit and/or the processor) the one or more processes described herein.

A method 210 of processing the digital data by the audio signal processor 206 is shown in FIG. 3, according to an illustrative embodiment. The method 210 processes the data using a machine learning algorithm, which allows the method 210 to be updated and modified without any changes to the hardware (e.g., the algorithm may be updated by importing software stored in cloud memory 306. As shown in FIG. 3, the method 210 includes data pre-filtering 234, feature extraction 236, feature reduction 238, event type classification 240, and event type publishing 242. In other embodiments, one or more of these operations may be omitted and/or additional operations may be added. As shown in FIG. 3, in an illustrative embodiment, a stream of digital audio data is provided to the audio signal processor 206. The digital audio data may include short snippets of audio at predetermined intervals (e.g., 5 s of audio data sampled once every minute) or a continuous sampling (e.g., a number of samples of audio data taken at even intervals in time). In an illustrative embodiment, the digital audio data is sampled continuously by the audio signal processor 206 at a sampling rate of 16 kHz (16,000 samples per second), although other sampling rates may be used depending on the target event type and processing algorithm implemented by the sensor 200. In a data pre-filtering operation 234, volume levels of the audio signal that are below a predetermined threshold are filtered out to remove unwanted acoustic/signal noise that manifest below a certain level/volume of sound, which might otherwise interfere with the classification or characterization of the event. The feature extraction 236 operation includes modifying the filtered audio data into a form that allows for a more accurate approximation of the event type. In one implementation, the feature extraction 236 portion includes performing a spectral analysis based on the filtered audio data to generate an extracted data set. In one example, a first spectrogram is computed using magnitudes of the Short-Time Fourier Transform (STFT) with a window size and a window hop based on the anticipated time range of impacts or other event-related data that may be included in the audio signal. The window size and window hop may also vary depending on the type of event being captured. Using a smaller window will provide a higher resolution in the time domain, whereas using a larger window will provide higher resolution in event frequency. For example, a smaller window size may be used to capture single impacts (e.g., a single impact of a hailstone or raindrop upon a building structure, etc.). In this case, the window size may vary between about 20 ms to 5 ms or less. In yet another example, a large window size may be used to capture the frequency of high intensity impacts (e.g., the frequency of high intensity impacts during a bounded time period, where the event type may be classified based the measured frequency). In this case, the window size may vary between about 20 and 40 ms or greater.

The window hop determines the amount of overlap between windows in the first spectrogram calculation. Too large a window hop can result in events being missed in the first spectrogram. For example, an event that initiates in one window and concludes in another may not be correctly accounted for. The window hop may be configured as a function of the window size. For example, the window hop may be approximately 50% of the window size or another fraction of the window size depending on the event types of interest.

Additional processing of the audio signal may be required to accurately classify the event. For example, the feature extraction process may include computing a second spectrogram from the first spectrogram. In an illustrative embodiment, a mel-frequency based spectrogram is computed from the first spectrogram to approximate the perceptual scale of pitch for a human. Using a mel-frequency based spectrogram to process the first spectrogram simulates the processing of spectral information in about the same way as human hearing. The mel-frequency based spectrogram may be generated by mapping (e.g., binning) the first spectrogram to approximately 64 mel bins covering a range between about 125 and 7,500 Hz. Features of the MEL spectrogram may be framed into non-overlapping examples of 0.96 s, where each example covers 64 MEL bands and 96 frames of 10 ms each. In other embodiments, the number of mel bins and frequency range may be different. For example, the second spectrogram could cover within the range of human hearing (e.g., 20 Hz-20 kHz) or greater depending on the type of event being characterized. In yet other embodiments, a different feature extraction method may be used to isolate important information from the first spectrogram (e.g., by computing the root-mean-square (RMS) energy from each frame, computing mel-frequency cepstral coefficients, etc.).

In the feature reduction operation 238, the number of independent variables resulting from the feature extraction 236 portion is reduced (e.g., to eliminate any independent variables that do not provide an accurate indication of the event type). In one implementation, the feature reduction 238 portion includes performing a principal component analysis (PCA) to reduce the feature set.

The method 210 also includes an event type classification operation 240, which analyzes the data in the reduced feature set to determine the type of event (e.g., hail vs. rain vs. wind, etc.) that most closely correlates with the data. In some implementations, event type classification operation 240 includes analyzing the reduced feature set using a convolutional neural network (CNN) based classifier or another machine learning classification approach to determine a probability that the audio corresponds to a given event type. This process may be repeated for each of the various event types included in the audio processing algorithm. The event type with the highest calculated probability is output as an event record and published to the cloud 300 in the event type publishing operation 242.

The algorithms incorporated in method 210 of FIG. 3 may be updated or "trained" remotely as new algorithms become available that improve existing models and/or incorporate new classifiable event types. This allows a single, unmodified sensor 200 (see FIG. 2) to be used for a longer period of time, while still providing a mechanism for improving the accuracy of the event data reported by the sensor 200.

Among other event types, the event may be a weather-related event where the event classification includes one of hail, rain, or excessive wind. Alternatively, the event type may be associated with animal activity, theft, or device activity proximate to the building. In an illustrative embodiment, the sensor 200 is configured to recognize any one of a variety of sounds including sounds related to engine diagnostics, road noise, train noise, plane noise, dog barking, gunshots, birdsong, lawn care equipment, construction, appliance diagnostics, industrial equipment diagnostics, sleep disturbance tracking, atypical noise tracking for home security, chainsaws related to deforestation, fire detection, crowd size analytics, tele med (heartbeat tracking, breath tracking), underwater sound analysis (whales, fish, motors, offshore drilling), seismic activity, crop pest detection, brewing analytics, safecracking/lockpicking, termite detection, rodent detection, and gas leak detection.

An event characteristic for a weather related event includes at least one of an intensity of the type of weather event (e.g., a number of hailstone impacts recorded during a given sample period, etc.) and a duration of the type of weather event (i.e., a total time period during which a continuous sampling of the weather-related event data is collected). In an embodiment, the sensor 200 determines, based on the magnitude and frequency of recorded impacts, that the event classification is hail. A resulting event characteristic for hail includes one of a hailstorm duration, an approximate hailstone size, a number of hailstone hits over time, a relative hailstone density, a timestamp of the hailstorm, a geolocation of the hailstorm, and a likelihood of hail related damage to the building upon which the sensor 200 is mounted. In another embodiment, the sensor 200 determines, based on the magnitude and frequency of recorded impacts, that the event classification is extreme wind. A resulting event characteristic for extreme wind includes one of an approximate gust speed, a gust duration, a gust interval, a duration of the wind event, a timestamp of the wind event, and a generalized likelihood of wind related damage to the building upon which the sensor 200 is mounted.

The event records may include one or more event characteristics associated with the event. In the embodiment of FIG. 3, the event records include a score that is associated with the probability that the audio corresponds to a given event type. This score may be indicative of the severity of the event. Alternatively, the various event classifications may include similar events of differing severity. In this implementation, the probability of the event would also provide an indication of one or more event characteristics.

As shown in FIG. 1, once published, the event records pass to a communications interface 208. As shown in FIG. 2, the communications interface 208 is disposed within the internal volume 218 of the housing 212 and is electrically coupled via bonding wires 232 to the audio signal processor 206. The communications interface 208 may be a wired or wireless telecommunications interface configured to link remotely with the cloud 300 (and the cloud infrastructure component 304 as shown in FIG. 1). The cloud infrastructure component 304 is configured to aggregate the incoming event records and pass the aggregated event records into cloud memory 306.

Figure 4:
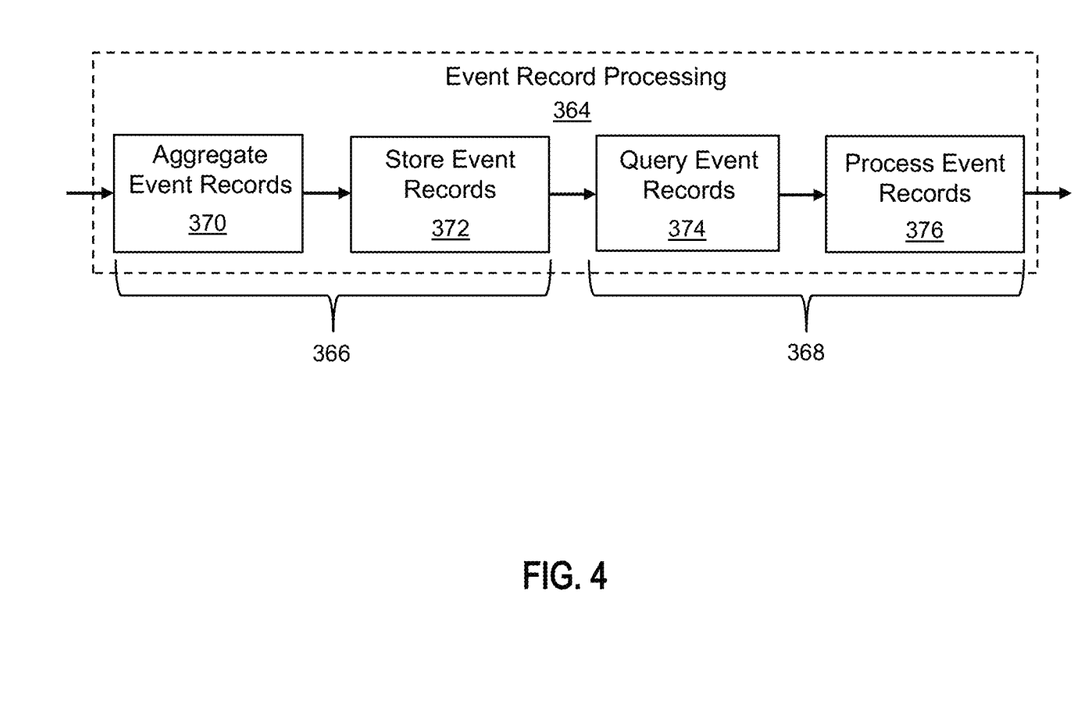
FIG. 4 is a block diagram for an event record processing method used in a cloud infrastructure component of an event sensing system, according to an illustrative embodiment.

The process of receiving and storing the incoming event records by the cloud infrastructure component 304 is illustrated schematically in FIG. 4, according to an embodiment of the present disclosure. The cloud infrastructure component 304 is communicatively coupled to the communications interface 208 of each one of the plurality of sensors 200 (see also FIGS. 1 and 3). In some embodiments, the cloud infrastructure component 304 is configured to continuously receive event records from each one of a plurality of sensors 200. A continuous sampling includes a number of data samples equally distributed in time, whereas a non-continuous sampling includes a number of samples that are taken within a small portion of the period (e.g., a number of samples taken in a 5 s interval once every minute). In some instances, a continuous sampling will provide a more accurate determination of the events start time and duration, since the sensor is continuously reporting data. However, the energy usage of a system that continuously samples data may be greater in comparison to a system that samples data non-continuously. In one embodiment, each one of the plurality of sensors 200 is mounted to a single surface of a building to improve event recognition and assessment. In another embodiment, each one of the plurality of sensors 200 is disposed on a different building within one or more geographic regions.

A method 364 of processing event records received by the cloud infrastructure component 304 is shown in FIG. 4, according to an illustrative embodiment. The method 364 includes a first set of operations, shown as ingress and storage operations 366, and a second set of operations, shown as event scoring operations 368. The ingress and storage operations 366 include aggregating event records 370 and storing the aggregated event records 372 into cloud memory 306 (see also FIG. 1). Once stored, the event scoring operations 368 are implemented to further analyze the event data. In the embodiment of FIG. 4, the event scoring operations 368 include querying event records 374 and processing the event records 376 using a predetermined algorithm as will be further described.

Figure 5:
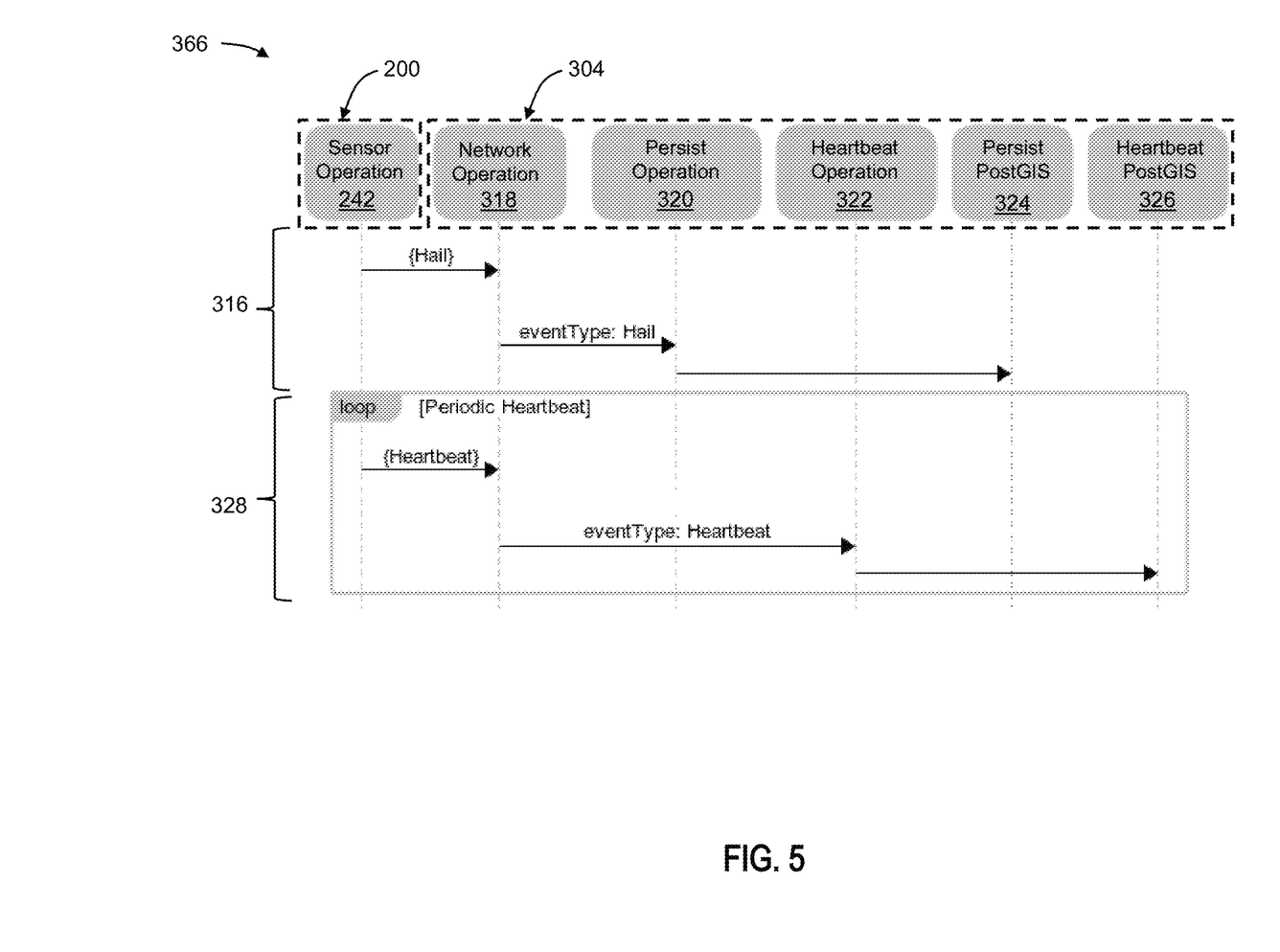
FIG. 5 is a block diagram for an event record processing method at a cloud infrastructure component of an event sensing system, according to an illustrative embodiment.

As shown in FIG. 5, the cloud processor 308 (see FIG. 1 for component references) is configured to perform ingress and storage operations 366 for the cloud infrastructure component 304, depending on whether an event is detected by the sensor 200. While various implementations discussed herein refer to a weather-based event (e.g., hail), it should be understood that that methodology applies equally to other event types including other types of weather events (e.g., rain, wind, etc.) as well as non-weather events (e.g., road noise, birdsong, lawn care equipment, construction, etc.). As shown in FIG. 5, the ingress and storage operations 366 for the cloud infrastructure component 304 include a plurality of operations. In various embodiments, one or more of these operations may be omitted or combined with other operations and/or additional operations may be included. The ingress and storage operations 366 are used to process and analyze event records generated by a sensor operation 242 as shown in FIG. 5. In the sensor operation 242, event records are generated that include information about an event type and one or more attributes associated with the event type. Event records may also be generated when no event is occurring (i.e., event records that do not include an event type and attributes associated with the event type).

The cloud processor 304 implements a network operation 318, which evaluates the event records to determine whether an event has been detected. For example, the event records may include an identifier that indicates whether an event has been detected. The network operation 318 could be configured to sort the event records based on the identifier. In some embodiments, the network operation 318 is configured to further sort the records based on event type or by an attribute of the event type.

The ingress and storage operations 366 for an event in progress include the operations indicated by arrows in an upper portion 316 of FIG. 4, while ingress and storage operations 366 when an event is not detected (e.g. ingress and storage operations 366 associated with event records used for heath monitoring of each sensor 200) include the operations indicated by arrows in the lower portion 328 of FIG. 4. While an event is in progress, the sensor operation 242 processes the audio signal data continuously (e.g., the number of samples processed is distributed evenly in time). For example, event records may be processed by the network operation 318 at a sampling rate of approximately 1 Hz. If the event records indicate that an event is in progress (e.g., if the event records include an event type and/or an event characteristic and/or an identifier as described in reference to the network operation 318) a persist operation 320 (e.g., an event processing operation, etc.) is performed. The persist operation 320 converts locational data (e.g., GPS coordinates, latitude/longitude, etc.) that is included in the event records to a point geometry (e.g., a single data value for location such as defined in the World geodetic System 1984). Among other benefits, converting the coordinates to a single referent point offers greater flexibility for geometry conversions to other projected coordinate systems. In other embodiments, the geometry conversion performed by the persist operation 320 may be different. In yet other embodiments, the persist operation may be eliminated entirely and the event records may be stored as-is. The event records may also be converted by the persist operation 320 to different data types; for example, data types that are more suitable for storage in cloud memory 306. The persist postGIS operation 320 stores the event records and locational data in cloud memory 306 (see also FIG. 1).

A second way of processing the event records occurs when no event is detected by the sensor 200 (i.e., when event records generated by the sensor 200 do not indicate that any event is occurring). To limit the amount of data transferred to cloud memory 306 by any one sensor 200, the sensor operation 242 shown in FIG. 5 processes the data non-continuously (e.g., the number of samples is not distributed evenly in time). For example, to limit the amount of data transferred to cloud memory 306 by any one sensor 200, the sensor operation 242 shown in FIG. 5 may only be performed periodically (e.g., may only process an event record once every 600 s or another suitable timeframe). As shown in FIG. 5, event records that do not indicate an event is occurring (referred to hereinafter as "no event" records) are identified by the network operation 318. A heartbeat operation 322 (e.g., a no-event processing operation, etc.) is then performed. In some embodiments, the heartbeat operation 322 includes monitoring sensor 200 health and providing an alert in the event of power loss to the sensor 200 or if some other sensor 200 malfunction is detected. In an embodiment, monitoring the health of the sensor 200 may include comparing event records from different sensors 200 located in close proximity to one another and determining whether there are any anomalies based on the event records. In another embodiment, monitoring the health of the sensor 200 may include evaluating historical event data to determine whether there exists a pattern of anomalous behavior. The heartbeat operation 322 may also be used to convert locational data (e.g., GPS coordinates, latitude/longitude, etc.) that is included in the event records to a point geometry (e.g., a single data value for location such as defined in the World geodetic System 1984) similar to the convert operation. A heartbeat postGIS operation stores the "no-event" event records and locational data in cloud memory 306

Figure 6:
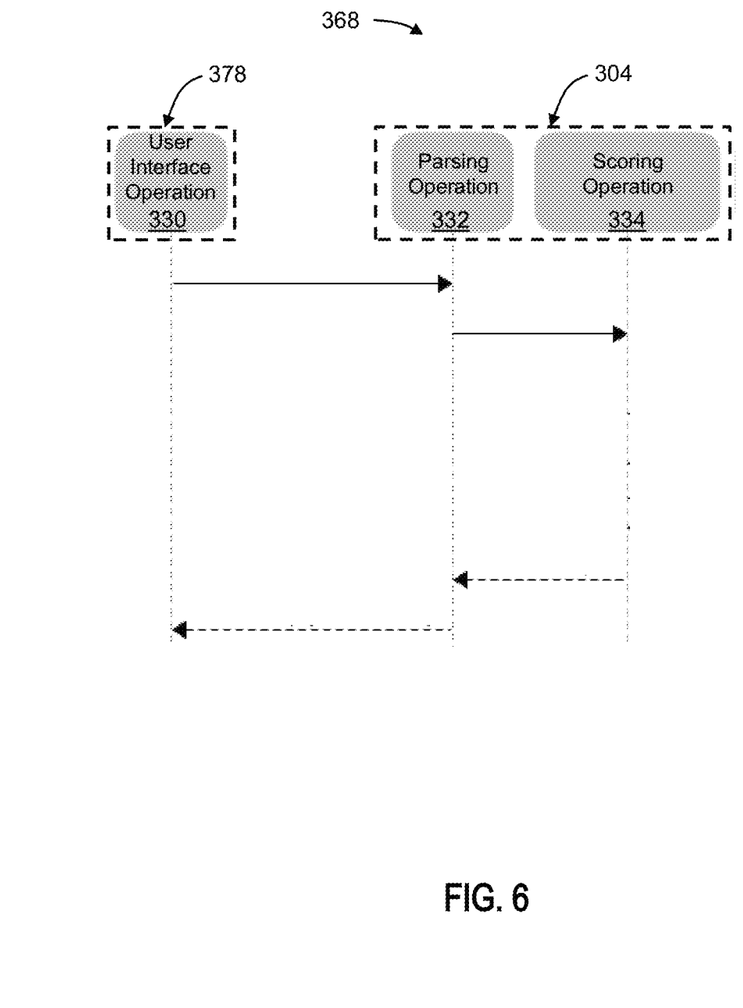
FIG. 6 is a block diagram for an event scoring method at a cloud infrastructure component of an event sensing system, according to an illustrative embodiment.

As shown in FIG. 6, the cloud processor 308 (shown in FIG. 1) is configured to perform event scoring operations 368 on event records queried event records queried from cloud memory 306. The event scoring operations 368 include computing a probability associated with an event occurring at a plurality of locations in a region within a bounded time window (having predetermined start and end times) based on the event records received from each sensor 200. As shown in FIG. 6, and similar to the ingress and storage operations detailed in FIG. 5, the event scoring operations 368 performed by the cloud processor 308 include a plurality of operations. In other embodiments, the event scoring operations 368 may omit one or more of these operations and/or include additional operations. In a user interface operation 330, a request is made to evaluate event data associated with a given location and time range (e.g., event records from a given number of sensors 200 based on their location). As shown in FIG. 1, the request to evaluate the event probability at the plurality of locations may originate at a data output system 378. Examples of a data output system 378 include a web-based user interface 344 from which a user may input a region of interest (e.g., a radius, R, about a specified GPS coordinate) and a start to end time window (e.g., time window) during which the event may have occurred. A parsing operation 332 parses query strings (e.g., such as GPS coordinates from a map selection on a graphical user interface, etc.) provided by a user in the web-based interface. For example, a user may input into the web-based user interface one, or a combination of, a start time (e.g., a start time as an ISO-8601 compliant date-time string), an end time (e.g., an end time as an ISO-8601 compliant date-time string), latitude for the query location, and a longitude for the query location. The user may enter this information manually or by selecting an appropriate region from a map presented via the web-based user interface. The parsing operation 332 may convert these parameters from JavaScript object notation (JSON) format to an application programming interface (API) call. The parsing operation 332 also converts results provided by the scoring operation 334 into strings or other suitable data types (e.g., JSON, etc.) for reporting to a user via the web-based interface As shown in FIG. 6, a scoring operation 334 computes a probability of an event occurring at one of a plurality of locations within the geographical region specified by a user in the web-based user interface. In an embodiment, the scoring operation 334 includes invoking a cloud function and using the cloud function to compute the probability of an event occurring at one of a plurality of locations within the geographical region. The cloud function may pull event records from a postGIS database or another data source to facilitate these computations. Calculations performed by the scoring operation 334 may be based on event records from any one of a plurality of sensors 200 within or outside the region of interest.

The scoring operation 334 computes the probability that the event occurred at a plurality of locations in a region within a bounded time window. The scoring operation 334 calculates the probability of the event occurring at each location based on event records from each one of the plurality of sensors 200 (see FIG. 2) located within or in close proximity to the region selected by the user in the web-based interface. In an embodiment, the scoring operation 334 calculates the probability of an event occurring at each one of the plurality of locations. In other embodiments, the scoring operation 334 calculates the probability of an event occurring at a first location within the region based on event records from a sensor assembly that is located at a second location. In this embodiment, the scoring operation 334 computes a probability of an event occurring at locations that do not have a sensor 200 on site (e.g., between two sensors 200 or proximate to an array of sensors 200 located on buildings near the location of interest).

The probability of an event occurring at a given location is calculated using an interpolation technique that assigns a higher weight to event records from sensors 200 that are nearest the location of interest (e.g., inverse distance weighted (IDW) interpolation) or assigns weights based on the areas covered by each sensor 200 (e.g., natural neighbor interpolation). Alternatively, an average of event data from sensors 200 within the region of interest may be used. In yet other embodiments, the measured noise levels and/or other event attributes are provided to a user directly (e.g., for event types such as machine diagnostics or other event types which do not involve geospatial coverage). As shown in FIG. 6, the parsing operation 332 converts the calculated probability of event occurrence to a human readable text format (e.g., into JSON or another human readable text format suitable for display in a graphical user interface). The user interface operation 330 returns results to the web-based interface for further analysis.

In the embodiment of FIG. 1, the system 100 is configured to supply additional external data (e.g., internet of things (IoT), public, licensed, crowdsourced, etc.) from external data sources 310 into cloud memory 306. This action may be facilitated by the use of API services in the cloud infrastructure component 304. In an embodiment, the additional external data supplied for incorporation into cloud memory 306 includes user generated event confirmations made from a mobile app or a web-based interface on a home computing device, as well as event data transmitted from a third party server. For example, for a weather-based event such as hail, rain, etc., a user may manually input or confirm the weather event using an app on their mobile phone. The mobile app may be configured to allow a user to provide information relating to a location where the event occurred, an event timestamp, and an image of the event for further confirmation. Alternatively or in combination, the API services in the cloud infrastructure component may be configured to periodically query a third party server for publically available weather data such as NOAA satellite or weather station data. The weather data could further include event characteristics such as estimated hail size, storm polygons along with a corresponding date of occurrence, etc. Among other benefits, incorporating additional external data into cloud memory 306 improves the accuracy and reliability of the system 100.

As shown in FIG. 1, the system 100 includes a data output system 378, which provides a mechanism for a user to query cloud memory 306 to export event records for further analysis and/or for incorporation of the event records (and additional external data) into visualizations. The data output system 378 is one or more devices (e.g., IoT devices such as mobile phones, laptop computers, etc.) configured to interface with the cloud infrastructure component 304. For example, the data output system 378 may be a computer that allows a user to access a web-based interface to extract ground-based sensor 200 data. The web-based interface may be configured to communicate with the cloud infrastructure component 304 to generate visualizations based on event records from one or more sensors 200. In an illustrative embodiment, the event records from multiple sensors 200 are used to perform geospatial mapping of an event for further logical analysis. The geospatial data may be presented graphically on a map interface, for example as isobars indicating the probability of the event in a given location calculated using the event scoring operations 368, as described above. The data reduction and analysis techniques described herein could also be used to compute macro characteristics of an event based on event records from multiple sensors 200. For example, an algorithm could utilize the probability score associated with a given event in a given geographic region calculated during different time periods to determine event characteristics such as storm directionality and speed. These macro event characteristics could be provided in real time to building owners in the path of the event to notify them to take action to reduce the likelihood of event-related property damage (e.g., to reduce the likelihood of property damage related to hail, wind, etc. in the case of a weather-related event).

Figure 7:
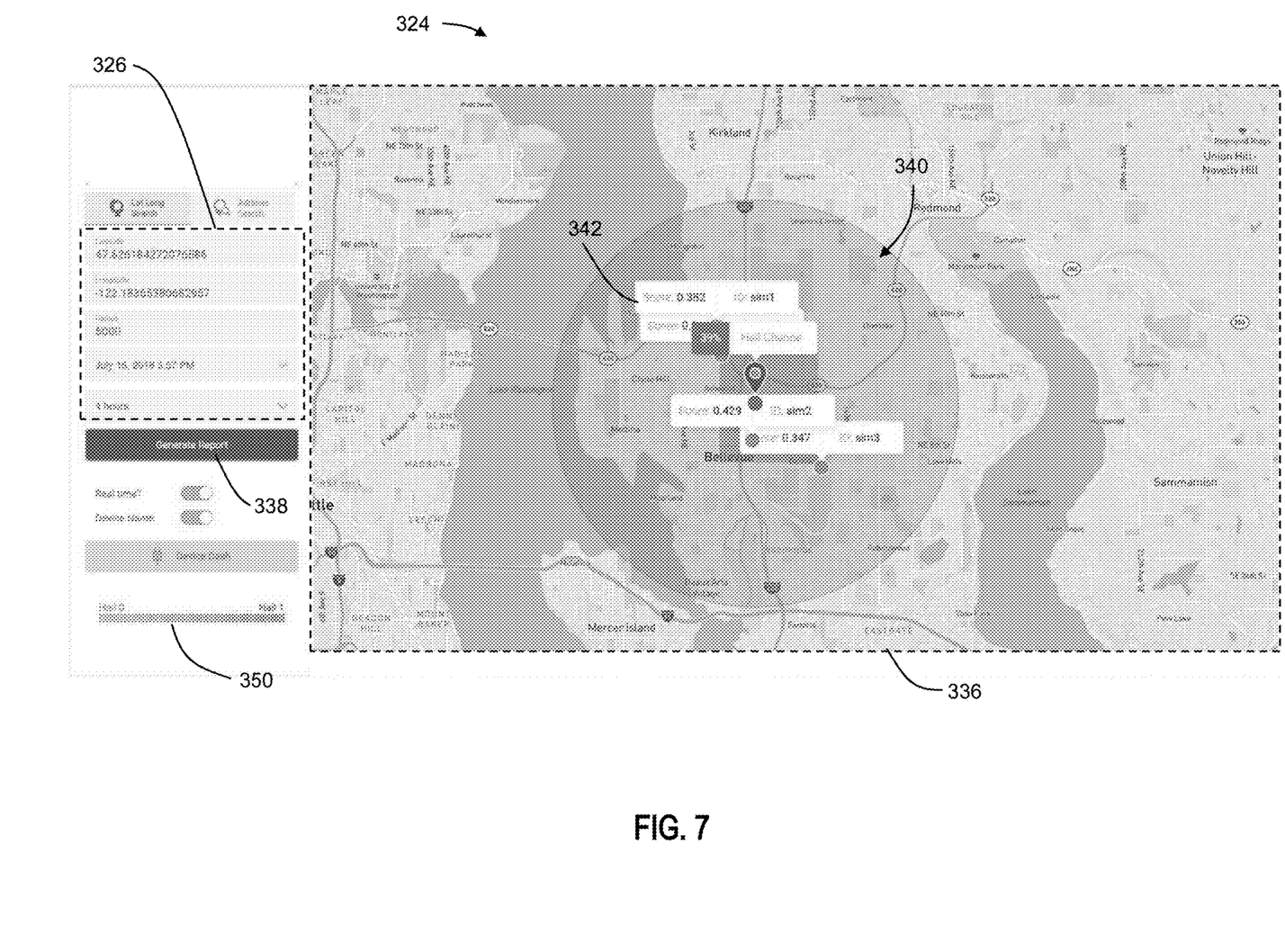
FIG. 7 is a graphical illustration of a web-based user interface for an event sensing system, according to an illustrative embodiment.

FIG. 7 shows a web-based user interface, shown as web-based interface 324, for an event sensing system 100

(see FIG. 1), according to an illustrative embodiment. The web-based interface 324, allows a user to search for event related data based on location (e.g., GPS coordinates or building address) and size of the area around the building of interest. The user may select a date, a time of interest, and a time period during which an event may have occurred. The web-based interface 324 may also provide an option for a user to incorporate data being received from one or more sensors in real time and/or to identify each sensor. In the embodiment of FIG. 7, these and other input parameters may be entered in a text entry block 326 and/or on a map interface 336.

The web-based interface 324 may be configured to generate a report for a user (e.g., a report in JSON format providing detailed calculation results for the area and/or for each sensor) based on the parameters input by a user. A generate report button 338 may be included for this purpose. The probability of an event occurring within the bounded time period may be indicated for the region and for each sensor. The probability may be indicated numerically, using a contour plot, or another suitable representation. In the embodiment of FIG. 7, the probability is indicated using a contour plot 340 overlaid onto the map interface 336 and pop-up windows 342 (e.g., balloons) at the location of each sensor. The web-based interface 324 also includes a legend 350 for the contour plot.

Figure 8:
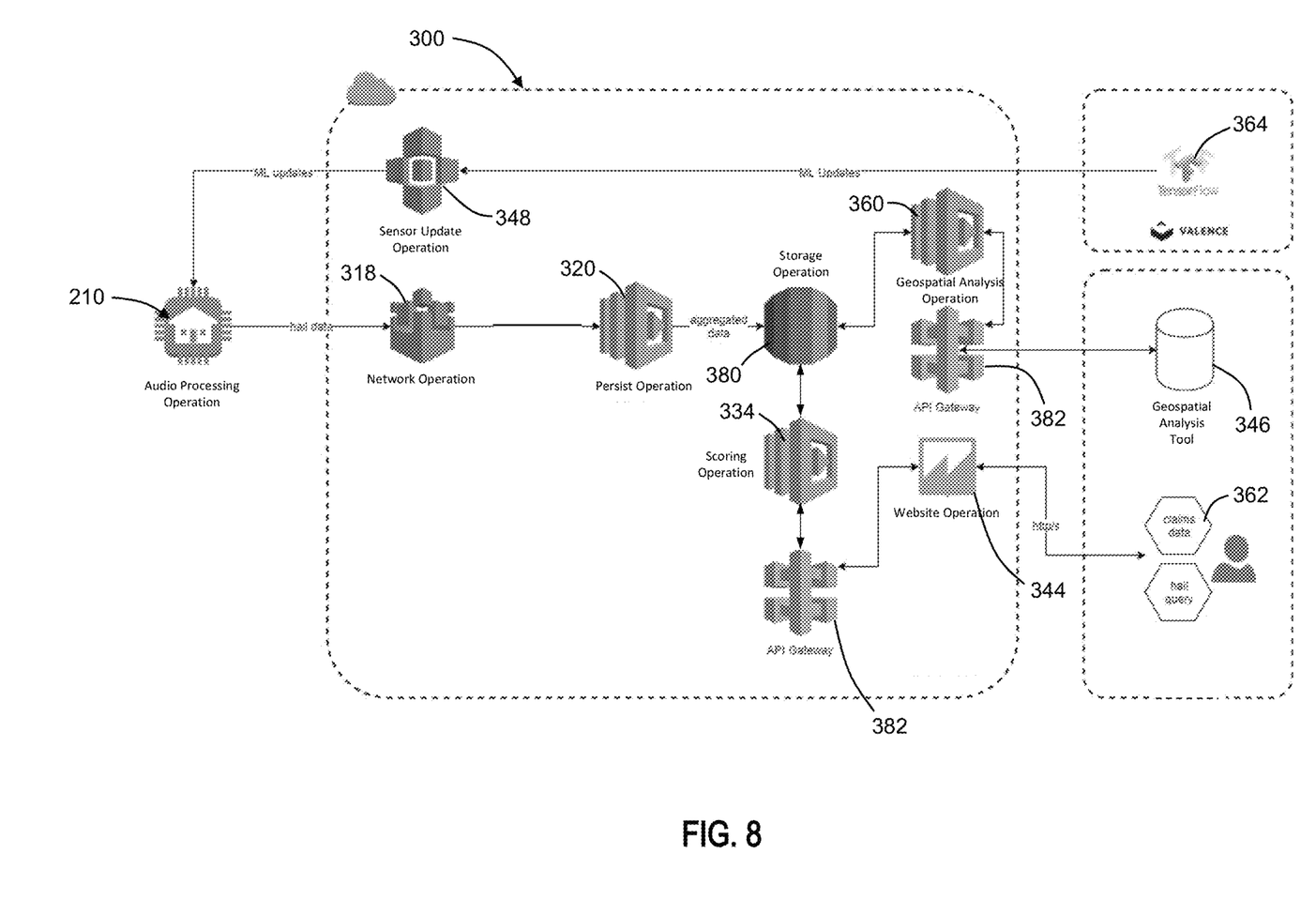
FIG. 8 is a schematic illustration of a cloud architecture for an event sensing system, according to an illustrative embodiment.

FIG. 8 provides a schematic representation of a cloud architecture for the event sensing system 100, according to an illustrative embodiment. As shown in FIG. 8, audio data, which is processed continuously by the audio signal processor 206 (see FIG. 1 and the method 210 of FIG. 3) at the sensor 200 level, is transferred in the form of event records from the sensor 200 to the cloud 300. The method 210 implemented by the audio signal processor 206 includes pre-processing tools that sort and filter the audio data as well as tools that classify the audio data and generate accompanying progenitor event characteristics (see FIG. 3). The cloud infrastructure component 304 includes ingress and storage operations 366 (see FIG. 5) that receive and modify incoming event records. These include the network operation 318, which receives and routes incoming event records. The network operation 318 may be configured to send event record information to a queue such as an Amazon Web Service (AWS) internet of things (IoT) topic. The queue may be partitioned by device ID and/or an identifier indicating whether an event has occurred. In alternative embodiments, the network operation 318 may also be configured to send event record information to a queue partitioned by event type. The network operation 318 may further include rules to act upon the event data received from the sensor based on event type or based on the identifier indicating whether an event has occurred. FIG. 8 also shows the persist operation 320, which modifies incoming event records continuously while an event is occurring. FIG. 8 also shows a storage operation 380, which represents the process of recording event data in cloud memory 306 (see FIG. 1) and includes cloud memory 306 access functions. The storage operation 380 is communicatively coupled to the scoring operation 334, which determines the probability that a given event has occurred in a user specified location within a given time period.

Access to event records and additional external data in cloud memory 306 is provided by way of API services 382. The ability to query information from cloud memory 306 by either data operations component 362 or by a decision-making hub, shown as decision hub 346 provides a mechanism for an insurance company to verify the occurrence and severity of events that result in insurance claims for damaged buildings. Among other benefits, access to ground-based sensor 200 data stored in the cloud 300 helps mitigate insurance fraud. Access to ground-based sensor 200 data also provides a mechanism for remotely assessing damage value for the building; for example, after a weather event such as hail, flooding, or extreme winds, where characteristics of the event (e.g., hail intensity, hail size, etc.) may be determined by API query to cloud memory 306 using a website operation 344 (e.g., a web-based user interface operation such as selecting an area from a map or entering GPS coordinates to obtain event related information).

As shown in FIG. 8, in addition to queries initiated via the website operation 344, the event records are also queried automatically by the geospatial analysis tool 346, which manages customer service related operations such as insurance claim initiation and processing, sales activities, customer interactions, etc. Queries initiated through the geospatial analysis tool 346 are performed by the geospatial analysis operation 360, which has the capability to perform geospatial logic for any number of contained data sets. Among other functions, the geospatial analysis operation 360 could incorporate the event data from each sensor and internally link or compare it to other data sets such as weather or insurance policies. This functionality may be used to notify a building owner to check for damage in an instance where the owner either wasn't present in the building at the time of the event or was unaware of the event. The geospatial analysis tool 346 may also be used to compare claims data from a client or inspector with event data from nearby sensors. The geospatial analysis tool 346 may also utilize event records in the cloud 300 to automatically generate insurance claims.

The cloud infrastructure component 304 also provides a sensor update operation 348 whose function is to provide additional event classification data to the audio signal processor 206 (see FIG. 1) at the sensor 200 level. The sensor update operation 348 is also used to update the processing algorithms used by the audio signal processor 206 (see FIG. 1 and the method 210 of FIG. 3) in order to improve the accuracy and the reliability of event detection. The machine learning (ML) system 364 is configured to generate sensor updates which are pushed down to the sensor via the sensor update operation 348. The ML system 364 (e.g., TensorFlow or another ML system 364) may be located on-site at the user's facility or at another location. In other embodiments, the ML system 364 is configured as a cloud operation.

Any major cloud service could be used to implement the cloud architecture of FIG. 8, including AWS, Microsoft Azure, Google Cloud, etc.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other with a separate intervening member and any additional intermediate members coupled with one another, or with the two members coupled to each other with an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the event sensing system 100 (shown in FIG. 1), including the sensor 200 and cloud infrastructure component 304 as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, mounting arrangements, use of materials, colors, orientations, values of parameters, and number and type of processing routines, etc.) without materially departing from the novel teachings and advantages of the subject matter described herein. For example, the position of elements in the sensor housing 212 (see FIG. 2) may be reversed or otherwise varied. Additionally, any element disclosed in one embodiment may be incorporated or utilized with any other embodiment disclosed herein.

What is claimed is:

1. An event sensing system comprising:
   a plurality of sensor assemblies, each one of the plurality of sensor assemblies coupled to one of a plurality of structures in a first region, each one of the plurality of sensor assemblies comprising:
   a housing comprising a base and a cover that is coupled to the base, the housing defining an internal volume, the base comprising a mount that is configured to couple the housing to an exterior surface of one of the plurality of structures;
   a microphone;
   an audio signal processor electrically coupled to the microphone, the audio signal processor configured to:
     process an audio signal generated by the microphone;
     generate an event classification and an event characteristic from the audio signal; and
     output event records, wherein the event records include the event classification and the event characteristic; and
   a communications interface electrically coupled to the audio signal processor; and
   a cloud infrastructure component communicatively coupled to the plurality of sensor assemblies, wherein the cloud infrastructure component is configured to:
     receive the event records from the audio signal processor of each of the plurality of sensor assemblies; and
     compute a probability associated with an event occurring at a plurality of locations in a second region away from the first region within a bounded time window based on the event records received from the plurality of sensor assemblies.

2. The event sensing system of claim 1, wherein the event characteristic is one of weather event directionality and weather event speed.

3. The event sensing system of claim 1, wherein the cloud infrastructure component is further configured to determine the probability associated with the event occurring at a location that does not include a sensor.

4. The event sensing system of claim 1, wherein the event characteristic is a likelihood of property damage.

5. The event sensing system of claim 1, wherein the cloud infrastructure component is configured to incorporate additional external data into the event records, wherein the additional external data includes one of user generated event confirmations made from a mobile app or software on a home computing device and event data transmitted from a third party server.

6. The event sensing system of claim 1, wherein each one of the plurality of sensor assemblies are coupled to one of a plurality buildings in the first region.

7. The event sensing system of claim 1, wherein the plurality of locations in the second region do not include a sensor assembly.

8. The event sensing system of claim 1, wherein the audio signal processor is configured to generate the event classification by:
   filtering out volume levels of the audio signal that are below a predetermined threshold to generate filtered audio data; and
   using a classifier to determine a type of weather-related event that most closely correlates with the filtered audio data.

9. The event sensing system of claim 1, wherein the event classification is indicative of a type of weather-related event, and wherein the event characteristic is indicative of a severity of the type of weather-related event.

10. The event sensing system of claim 1, wherein the audio signal processor is further configured to:
    convert an analog audio signal received from the microphone into digital data; and
    process the digital data into the event records via application of a machine learning algorithm.

11. The event sensing system of claim 1, at least one of the plurality of sensor assemblies further including a second microphone disposed outside of the housing, the second microphone configured to output a second audio signal, wherein the audio signal processor is further configured generate the event classification based on a difference in the audio signal provided by the microphone disposed in the housing and the second audio signal.

12. A method of processing event data from an event sensing system, comprising:
    receiving, by a cloud infrastructure component that is communicatively coupled to a plurality of sensor assemblies, event records from an audio signal processor of each one of the plurality of sensor assemblies, the plurality of sensor assemblies each including a housing that is coupled to one of a plurality of structures in a first region by mounts disposed on a base of the housing, the event records including an event classification and an event characteristic that are generated by the audio signal processor of each one of the plurality of sensor assemblies by processing an audio signal generated by a microphone onboard each one of the plurality of sensor assemblies; and
    computing, by the cloud infrastructure component, a probability associated with an event occurring at a plurality of locations in a second region away from the first region within a bounded time window based on the event records received from the plurality of sensor assemblies.

13. The method of claim 12, wherein the plurality of locations in the second region do not include a sensor assembly.

14. The method of claim 12, further comprising:
    capturing ambient audio as the audio signal using the microphone disposed within the housing;
    converting the audio signal to digital data; and
    processing the digital data into the event records, wherein processing the digital data includes classifying the digital data and generating accompanying progenitor event characteristics.

15. The method of claim 12, further comprising determining a type of event and a severity of the event based on the event records.

16. The method of claim 12, further comprising receiving additional external data for incorporation into the event records, the additional external data including at least one of user generated event confirmations made from a mobile app or software on a home computing device and weather data from a third party server.

17. The method of claim 12, further comprising computing a probability score based on the event records to estimate a probability of the event occurring at a specific location within the plurality of locations in the second region during a start-to-end time window.

18. The method of claim 12, further comprising assessing accuracy of an insurance claim by comparing the event records received by the cloud infrastructure component with information associated with the insurance claim.

19. The method of claim 12, further comprising automatically generating an insurance claim based on the event records received by the cloud infrastructure component.

20. The method of claim 12, wherein computing the probability associated with the event occurring includes computing the probability that the event resulted in damage to a property.

* * * * *